April 16, 1935.  G. W. NEWMAN  1,997,886
CHAIN POST
Filed April 14, 1934
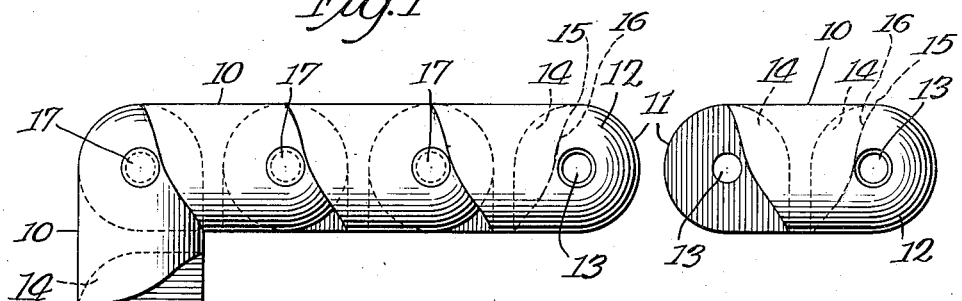
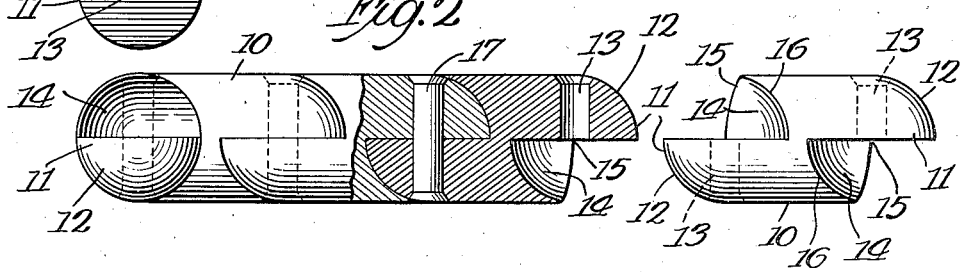
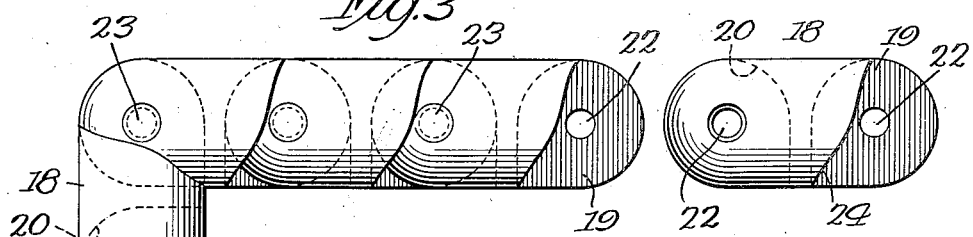
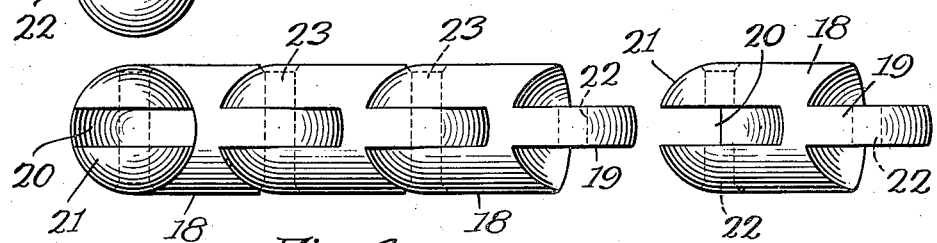
Inventor
George W. Newman
By Gillson, Mann &Co
Attys.

Patented Apr. 16, 1935

1,997,886

UNITED STATES PATENT OFFICE 1,997,886

CHAIN POST

George W. Newman, St. Louis, Mo., assignor to Loose Leaf Metals Company, a corporation of Missouri Application April 14, 1934, Serial No. 720,505

5 Claims. (Cl. 59—78)

The invention relates to chains especially adapted for use as posts in loose leaf binders.

The principal object of the invention is to provide a chain for this service which will not permit the sheets carried by the binder to enter its joints.

A further object of the invention is to provide a chain which will be sturdy and durable.

The invention resides in the form of the links of which the chain is made, and will be best understood from the following description.

In the accompanying drawing illustrating two embodiments of the invention, which, however, is capable of being made up in other forms—

Fig. 1 is a side elevation of a section of the improved chain, one of the links being disconnected;

Fig. 2 is a longitudinal sectional view of the chain, one of the links being detached and shown in elevation;

Figs. 3 and 4 are views similar to Figs. 1 and 2, respectively, showing a modified form of construction.

The chain is made up of a plurality of links, each of which takes the form of an oblong block having its ends configured to pivotally engage similar blocks.

In the form of construction shown in Figs. 1 and 2, each link is in the general form of an oblong block 10, of circular section, having one-half of each end portion removed, leaving a projection 11, the end of which is rounded, as shown at 12, to form a quarter of a spherical surface. At the base of this section, and approximately on a diameter of the sphere, the block is transversely pierced to form a pintle aperture 13, the axis of which is normal to the flat face of the sphere section. Fronting this face the body of the block is recessed, as indicated at 14, the recess being in part complementary to the sphere section 12. The margin of this recess is substantially in line with the axis of the pintle aperture 13, and from this point recedes relatively to the end of the block, as indicated at 16, the surface of the recess merging into the section of a cylinder.

The two ends of the link are alike, except that the described features are on opposite sides of its longitudinal axis. The adjacent links fit together, as shown in Fig. 2, and are united by means of pintles, as 17. The depressed portion of the margin 16 of the recess 14 permits the chain to flex in that direction, while the elevated portion 15 of the rim of this recess prevents material flexure of the chain in the opposite direction.

The links thus formed are united by a pair of semi ball and socket joints, the contacting faces of which are always in engagement, thereby leaving no crack or opening for the entrance of the edges of the bound sheets.

In the form of construction illustrated in Figs. 3 and 4, the semi ball and socket joint is present, the links, however, being of the mortise and tenon type. Each link is in the form of an oblong block 18, preferably of circular section, from one end of which projects a tenon 19, the opposite end of the block being provided with a complementary socket 20 for receiving the tenon of the adjoining link. The slotted end of the link is rounded, as at 21, to a section of a sphere, through the face of which the slot 20 enters. The end of the tenon 19 is correspondingly rounded to the section of a sphere.

The inner ends of the slots 20 are rounded complementary to the rounded end of the tenon 19, and at the base of the rounded portion of each end of the block there is formed a pintle aperture, as 22.

As the links are assembled into a chain the tenon of each enters the slot 20 in the next adjacent link, their apertures 22 registering to receive the pintle 23. The margin of the recesses flanking the tenon 19 are at one end substantially in line with the pintle aperture, receding therefrom to the opposite end, as shown at 24, thereby preventing material flexure of the chain in one direction while permitting it in the other.

The spherical form of the slotted end of the block and of the end of the tenon, and the complementary form of the sockets which receive these elements, insure a closed marginal joint which will not permit the entrance of the bound sheets. The parts fit together so snugly that the chain is sturdy and substantially rigid when extended.

I claim as my invention—

1. A hinge link in the form of an oblong block having its ends complementary in form, a part of each end portion being rounded to a section of a sphere and comprising less than half of a sphere, the body of the block at the base of such rounded portion being recessed to receive the correspondingly rounded end of a similar link, the link having pintle apertures at the base of its rounded portions.

2. A chain link cylindrical in general contour and having complementary ends, each end having the form of two quadrants of a common sphere, one being in relief and one in intaglio, and a pivot aperture diametrical as to both quadrants, the rim of the recessed quadrant receding toward one of the ends of such rim.

3. A chain link cylindrical in form and having complementary ends, each end comprising a tenon, the face of which has the form of a segment of a sphere, and a recess of corresponding shape and size, and a pivot aperture normal to the side face of the tenon.

4. A chain link in the form of an oblong block having complementary ends, one end of the block being in the form of a section of a sphere and centrally slotted, the bottom of the slot being curved concentrically with the rounded end portion, the other end of the block comprising a tenon adapted to fit within the slotted end of an adjacent link of like form, and concave shoulders for receiving the rounded end portion of the slotted end of an adjacent link of like form, both ends of the link having an aperture for a pivot pin, such apertures being on diameters of the sphere of which such rounded faces are sections and normal to the side faces, respectively, of the named tenon and slot.

5. A chain composed of links, each link being in the form of an oblong block having complementary ends, one end of the block being in the form of a section of a sphere and being centrally slotted, the bottom of the slot being curved concentrically with the rounded end portion, the other end of the block comprising a tenon adapted to fit within the slotted end of an adjacent link of like form and having concave shoulders for receiving the rounded portions of the slotted end of an adjacent link of like form, both ends of each link having an aperture for a pivot, such apertures being on diameters of the sphere of which such rounded portions are sections and normal to the side faces, respectively, of the named tenon and slot, and means for preventing flexure of adjacent links in one direction.

GEO. W. NEWMAN.